Patented May 18, 1937

2,080,752

UNITED STATES PATENT OFFICE 2,080,752

ESTERS OF TERPENE AND ABIETYL COMPOUNDS AND METHOD OF PRODUCING SAME

Kyle Ward, Jr., Wilmington, Del., assignor to Hercules Powder Company, Wilmington, Del., a corporation of Delaware No Drawing. Application June 21, 1934, Serial No. 731,676

22 Claims. (Cl. 260—99)

This invention relates to new and advantageous chemical compounds and method for their production.

More particularly, the compounds to which this invention relates are believed to be of the nature of cyclic acetates and di-acetates or homologous esters and comprise products of the treatment of unsaturated terpene and abietyl compounds with organic salts of tetra-valent lead, or alternatively with a mixture of red lead and an organic carboxylic acid.

The compounds in accordance with this invention are variously advantageous for use in the commercial arts, as, for example, variously for plasticizing cellulose esters and ethers, as nitrocellulose, cellulose acetate, ethyl cellulose, cellulose acetobutyrate, etc., for the formation of films, coatings, plastics, etc.; and variously as solvents for olive oil, linseed oil, rosin, chlorinated rubber, cellulose esters and ethers, etc. When used as plasticizers or solvents the compounds according to this invention may be readily formulated by those skilled in the art with consideration of the purpose for which any given composition in which they may be included is intended.

In preparing compounds embodying this invention by the method in accordance therewith unsaturated terpene and abietyl compounds generally may be used. As illustrative, for example, pinene, dipentene, neutral rosin oil, methyl abietate, etc. will be found satisfactory. Likewise, any organic salt of tetra-valent lead, as, for example, lead tetra-acetate, lead tetra-butyrate, lead tetra-propionate, lead tetra-benzoate, etc. may be used, or, alternatively, red lead and an organic carboxylic acid, as acetic, butyric, propionic, benzoic, etc. may be used.

In general, the method in accordance with this invention involves direct oxidation, with an organic salt of tetra-valent lead, or, alternatively, with red lead and an organic carboxylic acid, of an unsaturated terpene or abietyl compound in the liquid phase, with or without a solvent such as liquid organic carboxylic acid, followed by separation of the lead salt and acid by, for example, freezing, steam distillation, or the like, and finally by fractionation of the crude product.

As more specifically illustrative, for example, 68 parts of pinene in 100 parts of acetic acid are treated on a steam bath with 225 parts of lead tetra-acetate. After one hour on the steam bath, the mixture is poured into water, and extracted with ether. The ether extract is then dried, and distilled, giving 10 parts of a liquid boiling from 60–100° C. at 20 mm. pressure, and 20 parts boiling from 80–140° C., and leaving a residue amounting to 10–15 parts, which solidifies on cooling. The two liquid fractions are almost colorless liquids, with a strong, fragrant odor like that of terpinyl acetate, and they will dissolve olive oil, linseed oil, rosin, chlorinated rubber, nitrocellulose, cellulose acetobutyrate, ethyl cellulose, and butylhydroxyethyl cellulose.

As further illustrative, for example, 280 parts of pinene in one liter of acetic acid are treated with red lead at a temperature of about 60° C. until absorption ceases (1200 parts). The red lead is desirably added in portions and the reaction mass is agitated or shaken after each addition of red lead. As the absorption proceeds, a layer of oil forms above the acetic acid-lead acetate solution. When absorption ceases the mass is cooled to 0° C., at which temperature the lower layer will solidify, and the upper layer of oil is then poured off. The solid layer (mostly lead acetate) is triturated with ether. The ether extract is then added to the oil, and the combined material washed free of lead with water, and free of acid with sodium bicarbonate. After drying over calcium chloride, the ether is evaporated. The resulting, brownish oil is then distilled at 20 mm. pressure, and gives the following fractions:

| | | | |
|---|---|---|---|
| 1. | 60–100° C. | 118 cc. | Largely unchanged pinene |
| 2. | 100–125° C. | 32 cc. | Pale yellow, fragrant liquid |
| 3. | 125–150° C. | 35 cc. | Pale yellow, very fragrant liquid |
| 4. | 150–175° C. | 35 cc. | Yellow, fragrant liquid |
| 5. | Residue | 51 g. | Odorless, red resin |

Fraction 2 contains largely a monoacetate, while fraction 4 contains largely a diacetate. Fractions 4 and 5 have a pronounced plasticizing action on cellulose acetate, and give a clear, colorless film. They are also plasticizers for ethyl cellulose films.

As a further illustration, for example, 280 parts of dipentene are dissolved in one liter of glacial acetic acid and treated with 950 parts of red lead at a temperature of about 60° C. On completion of the reaction the product may be worked up as in the above example. The yield will be about 345 parts, 225 of which are distilled at 1 mm. Much of the low-boiling portion will be lost, probably because it comprises unchanged dipentene, with perhaps residual solvent ether. The following fractions are obtained:

| | | | |
|---|---|---|---|
| 1. | 50– 75° C. | 108 cc. | Colorless, largely dipentene |
| 2. | 75–115° C. | 14 cc. | Bright, yellow, fragrant odor |
| 3. | 115–140° C. | 16 cc. | Yellow, slight odor |
| 4. | 140–160° C. (decompn.) | 11 cc. | Dark yellow, aromatic odor |
| 5. | Residue | 19 g. | Black, solidifies to resin, odorless |

These different fractions dissolve rubber, oils, nitrocellulose, and cellulose acetate. One hundred and ten cc. of the crude reaction product when distilled at 20 mm. pressure gives a residue boiling above 148° C. at 20 mm. pressure, which has excellent plasticizing action on cellulose acetate and ethyl cellulose.

As a further illustration, using an abietyl compound, for example 27.6 parts of "Neutroyl"

(neutral rosin oil) are dissolved in 50 parts of toluene, and treated with 56 parts of lead tetra-acetate. A slight heating will be noted to develop. The mixture is heated over night in a steam bath. After working up as in the preceding examples, the product will be found to be a light yellow oil, resembling the original neutral rosin oil in appearance, but having a slight aromatic odor and chemically different in that it has a saponification number of 126.5, whereas the original material had a saponification number of 0, and a thiocyanate value of 35 as compared with 83 for the original material. Approximately 35% conversion into a "Neutroyl" di-acetate is indicated by analysis. This material has a good plasticizing action on cellulose acetate and ethyl cellulose.

In the above examples, instead of using lead tetra-acetate, one may use other organic salts of tetra-valent lead, such as tetra-propionate, tetra-butyrate, tetra-benzoate, etc. By way of illustration, for example, such salts may be reacted as follows: Pinene is oxidized as described with lead tetra-butyrate, and dipentene is oxidized as described with lead tetra-propionate. The products will distill well above the boiling points of the original raw materials and will have ester-like odors similar to the corresponding products produced in the above examples of lead tetra-acetate oxidation. The same will be true when pinene and dipentene are oxidized in propionic acid or butyric acid at 60° C. by gradual addition of red lead. These latter reactions are much slower than when acetic acid is used.

It will be understood that the method in accordance with this invention follows broadly the direct oxidation of an unsaturated terpene or abietyl compound with an organic salt of tetra-valent lead, or alternatively with red lead and an organic carboxylic acid, which alternative procedure it will be understood, is contemplated by me as equivalent within the terms of the method claims appended hereto. Further, that in procedure in accordance with the method involving this invention heat is desirably used. However, it will be understood that particular temperature is in no sense of the essence of the invention. Desirably, in proceeding with the use of an organic salt of tetra-valent lead or with red lead and an organic carboxylic acid, a temperature of about 60° C. will be used. However, here again particular temperature is not of the essence, and the temperature employed depends largely upon the particular unsaturated terpene or abietyl compound being oxidized. Temperatures above about 150° C. need seldom be employed however.

It will be understood that from the product standpoint this invention comprehends the products of the method, which, as indicated, are believed to be cyclic acetates and di-acetates, or homologous esters. Further, it will be understood that products in accordance with this invention will be found to be advantageous for use variously as solvents and as plasticizers for cellulose esters, ethers and mixed ethers. The products will, as has been indicated, be formulated in any desirable manner as ingredients of any given composition with reference to the purpose for which such composition is intended.

Abietyl compound, as the term is used in this specification and in the claims hereinafter set forth, refers to compounds containing the hydrocarbon nucleus of abietic acid.

It will be understood that it is not contemplated that this invention shall be limited by the specific disclosure and examples herein given for purposes of full disclosure and illustration of the invention.

What I claim and desire to protect by Letters Patent is:

1. The method of producing an ester adapted for use as a solvent, plasticizer and the like, which includes reacting an unsaturated compound selected from the group consisting of unsaturated terpene compounds and unsaturated abietyl compounds with an organic monocarboxylic acid salt of tetra-valent lead.

2. The method of producing an ester adapted for use as a solvent, plasticizer and the like, which includes reacting an unsaturated compound selected from the group consisting of unsaturated terpene compounds and unsaturated abietyl compounds with a fatty acid salt of tetra-valent lead.

3. The method of producing an ester adapted for use as a solvent, plasticizer and the like, which includes reacting an unsaturated compound selected from the group consisting of unsaturated terpene compounds and unsaturated abietyl compounds with lead tetra-acetate.

4. The method of producing an ester adapted for use as a solvent, plasticizer and the like, which includes reacting pinene with lead tetra-acetate.

5. The method of producing an ester adapted for use as a solvent, plasticizer and the like, which includes reacting dipentene with lead tetra-acetate.

6. The method of producing an ester adapted for use as a solvent, plasticizer and the like, which includes reacting neutral rosin oil with lead tetra-acetate.

7. The method of producing an ester adapted for use as a solvent, plasticizer and the like, which includes reacting an unsaturated compound selected from the group consisting of unsaturated terpene compounds and unsaturated abietyl compounds with a mixture of red lead and an organic monocarboxylic acid.

8. The method of producing an ester adapted for use as a solvent, plasticizer and the like, which includes heating an unsaturated compound selected from the group consisting of unsaturated terpene compounds and unsaturated abietyl compounds with a mixture of red lead and a fatty acid at a temperature of about 60° C.

9. The method of producing an ester adapted for use as a solvent, plasticizer and the like, which includes reacting pinene with an organic monocarboxylic acid salt of tetra-valent lead.

10. The method of producing an ester adapted for use as a solvent, plasticizer and the like, which includes reacting dipentene with an organic monocarboxylic acid salt of tetra-valent lead.

11. The method of producing an ester adapted for use as a solvent, plasticizer and the like, which includes reacting neutral rosin oil with an organic monocarboxylic acid salt of tetra-valent lead.

12. The method of producing an ester adapted for use as a solvent, plasticizer and the like, which includes heating an unsaturated compound selected from the group consisting of unsaturated terpene compounds and unsaturated abietyl compounds with an organic monocarboxylic acid salt of tetra-valent lead in the presence of a fatty acid.

13. The method of producing an ester adapted for use as a solvent, plasticizer and the like, which includes heating an unsaturated compound selected from the group consisting of unsaturated terpene compounds and unsaturated abietyl compounds with an organic monocarboxylic acid salt of tetra-valent lead in the presence of a fatty acid and separating fatty acid and lead salt from the reaction product.

14. The method of producing an ester adapted for use as a solvent, plasticizer and the like, which includes heating an unsaturated compound selected from the group consisting of unsaturated terpene compounds and unsaturated abietyl compounds with an organic monocarboxylic acid salt of tetra-valent lead in the presence of a fatty acid and fractionating the reaction product.

15. A reaction product of an organic monocarboxylic acid salt of tetra-valent lead and an unsaturated compound selected from the group consisting of unsaturated terpene compounds and unsaturated abietyl compounds characterized by the fact that it comprises esters of hydroxy derivatives of said unsaturated compound.

16. A reaction product of lead tetra-acetate and an unsaturated compound selected from the group consisting of unsaturated terpene compounds and unsaturated abietyl compounds characterized by the fact that it comprises esters of hydroxy derivatives of said unsaturated compound.

17. A reaction product of pinene with lead tetra-acetate characterized by the fact that it comprises esters of hydroxy derivatives of pinene.

18. A reaction product of pinene with an organic monocarboxylic acid salt of tetra-valent lead characterized by the fact that it comprises esters of hydroxy derivatives of pinene.

19. A reaction product of dipentene with lead tetra-acetate characterized by the fact that it comprises esters of hydroxy derivatives of dipentene.

20. A reaction product of dipentene with an organic monocarboxylic acid salt of tetra-valent lead characterized by the fact that it comprises esters of hydroxy derivatives of dipentene.

21. A reaction product of neutral rosin oil with lead tetra-acetate characterized by the fact that it comprises esters of hydroxy derivatives of neutral rosin oil.

22. A reaction product of neutral rosin oil with an organic monocarboxylic acid salt of tetra-valent lead characterized by the fact that it comprises esters of hydroxy derivatives of neutral rosin oil.

KYLE WARD, Jr.